United States Patent
Zuckerman et al.

(10) Patent No.: US 11,467,827 B1
(45) Date of Patent: *Oct. 11, 2022

(54) INDEX SPACE MAPPING USING STATIC CODE ANALYSIS

(71) Applicant: HABANA LABS LTD., Caesarea (IL)

(72) Inventors: Michael Zuckerman, Tel Aviv (IL); Tzachi Cohen, Tzur-Igal (IL); Doron Singer, Tel Aviv (IL); Ron Shalev, Pardes Hana-Karkur (IL); Amos Goldman, Pardes Chana Karkur (IL)

(73) Assignee: HABANA LABS LTD., Caesarea (IL)

( * ) Notice: Subject to any disclaimer, the term of this patent is extended or adjusted under 35 U.S.C. 154(b) by 57 days.

This patent is subject to a terminal disclaimer.

(21) Appl. No.: 17/223,045

(22) Filed: Apr. 6, 2021

Related U.S. Application Data (63) Continuation-in-part of application No. 17/175,733, filed on Feb. 15, 2021.

(60) Provisional application No. 63/008,845, filed on Apr. 13, 2020.

(51) Int. Cl.
| | |
|---|---|
| *G06F 8/75* | (2018.01) |
| *G06F 9/48* | (2006.01) |
| *G06F 8/41* | (2018.01) |
| *G06F 12/10* | (2016.01) |

(52) U.S. Cl.
CPC .......... *G06F 8/75* (2013.01); *G06F 8/41* (2013.01); *G06F 9/4881* (2013.01); *G06F 12/10* (2013.01); *G06F 2212/1044* (2013.01)

(58) Field of Classification Search
None
See application file for complete search history.

(56) References Cited

U.S. PATENT DOCUMENTS

| | | |
|---|---|---|
| 10,489,479 B1 | 11/2019 | Gofman et al. |
| 10,713,214 B1 | 7/2020 | Halutz et al. |
| (Continued) | | |

OTHER PUBLICATIONS

Agosta et al., "Detecting Data Access Patterns in OpenMP Parallel Loops", Politecnico Di Milano, pp. 1-110, years 2011-2012.
(Continued)

*Primary Examiner* — Lewis A Bullock, Jr.
*Assistant Examiner* — Mark A Gooray
(74) *Attorney, Agent, or Firm* — Kligler & Associates Patent Attorneys Ltd (57) ABSTRACT

A method for computing includes providing software source code defining a processing pipeline including multiple, sequential stages of parallel computations, in which a plurality of processors apply a computational task to data read from a buffer. A static code analysis is applied to the software source code so as to break the computational task into multiple, independent work units, and to define an index space in which the work units are identified by respective indexes. Based on the static code analysis, mapping parameters that define a mapping between the index space and addresses in the buffer are computed, indicating by the mapping the respective ranges of the data to which the work units are to be applied. The source code is compiled so that the processors execute the work units identified by the respective indexes while accessing the data in the buffer in accordance with the mapping.

22 Claims, 7 Drawing Sheets

(56) References Cited

U.S. PATENT DOCUMENTS

| | | | |
|---|---|---|---|
| 2005/0039167 A1* | 2/2005 | Fernandes | G06F 9/3838 |
| | | | 712/E9.046 |
| 2014/0331014 A1 | 11/2014 | Liao | |
| 2016/0170770 A1* | 6/2016 | Cain, III | G06F 9/30109 |
| | | | 712/219 |
| 2017/0147531 A1 | 5/2017 | Bekas et al. | |
| 2020/0301877 A1* | 9/2020 | Gupta | G06F 9/52 |

OTHER PUBLICATIONS

Zima, "On Computational Properties of Chains of Recurrences," ACM Proceedings of International Symposium on Symbolic and Algebraic Computation, pp. 1-8, year 2001.

Pop et al., "Fast Recognition of Scalar Evolutions on Three-Address SSA Code", CRI/ENSMP Research Report A/354/CRI, pp. 1-28, Apr. 1, 2004.

Bachman et al., "Chains of Recurrences—a Method to Expedite the Evaluation of Closed-Form Functions," ACM Proceedings of International Symposium on Symbolic and Algebraic Computation, pp. 242-249, Jul. 1994.

Grosser, "Enabling Polyhereal Optimizations in LLVM," Diploma Thesis, Programming Group, Department of Informatics and Mathematics, University of Passau, Germany, pp. 1-101, Apr. 2011.

Birch et al., "An Empirical Evaluation of Chains of Recurrences for Array Dependence Testing," ACM Proceedings of PACT'06, Seattle, USA, pp. 295-304, Sep. 16-20, 2006.

Engelen, "Efficient Symbolic Analysis for Optimizing Compilers", Proceedings of the 10th International Conference on Compiler Construction, pp. 118-132, Apr. 2001.

* cited by examiner

```
#define FLOAT32
#include "config_kernels_type.h"
void main(tensor input0, tensor output)
{
    const int5 index_space_start = get_index_space_offset();
    const int5 index_space_end = get_index_space_size() + index_space_start;
    ...
    VECTOR in;
    #pragma loop_taken
    for(int d=depthStart; d < depthEnd;  d += depthStep)
        #pragma loop_taken
        for (int b = batchStart; b < batchtEnd; b += batchStep)
            #pragma loop_taken
            for (int h = heightStart; h < heightEnd; h += heightStep)
                for (int w = widthStart ; w < widthEnd; w += widthStep)
                {
                    int5 ifmCoords = {d,  w,  h , b}; //{depthstep, widthStep, heightStep, batchStep}
                    int5 ofmCoords = {d,  h,  w,  b}; //{depthstep, heightStep, widthStep, batchStep}
                    in = v_ld_tnsr_i(ifmCoords  , input0  );
                    st_tnsr_i_v (ofmCoords , output , in );
                }
```

FIG. 7

INDEX SPACE MAPPING USING STATIC CODE ANALYSIS

CROSS-REFERENCE TO RELATED APPLICATION

This application is a continuation-in-part of U.S. patent application Ser. No. 17/175,733, filed Feb. 14, 2021, and claims the benefit of U.S. Provisional Patent Application 63/008,845, filed Apr. 13, 2020. Both of these related applications are incorporated herein by reference.

FIELD OF THE INVENTION

The present invention relates generally to multiprocessor computer systems, and particularly to methods for parallelization and pipelining of computer system operations, as well as devices and software implementing such methods.

BACKGROUND

Deep learning workloads are highly computation-intensive and often benefit from parallelization of computing tasks in specialized multiprocessor devices, such as graphic processing units (GPUs). Convolutional neural networks (CNNs), for example, typically comprise multiple convolutional layers, each of which performs multidimensional convolutions between an input tensor and a set of filter kernels. The convolutional layers are interleaved in a pipeline with other computational layers that perform operations such as pooling and linear unit rectification. Each layer in the pipeline writes the results of its computations to an output buffer, which becomes the input buffer for the next stage.

The term "parallel computations," as used in the context of the present description and in the claims, refers to arrangements in which multiple processors concurrently execute tasks related to a program objective. Typically, a large problem is divided into multiple smaller computations, also referred to as tasks, which are submitted to the individual processors. The term "pipeline" as used in the present context refers to a series of tasks or subprograms, performed the processors in an overlapping or time-sliced fashion, in which a computational result produced by a first processor, which performs a first task, is transferred as an input to a second processor, which performs a second task. The computational result of the second processor is typically transferred as an input to a third processor, and so forth.

To enable efficient programming and parallel execution of these sorts of workloads, a number of parallel programming models and application programming interfaces (APIs) have been developed, such as CUDA®, OpenCL™ and SYCL™. These models break the workload up into independent work units, which can execute in a random order. Each work unit is identified by an index in an index space of the computational operation to which it belongs. The non-deterministic order of execution of the work units typically mandates that the data in the input buffer of a given processing stage be available in its entirety before any part of its assigned workload begins execution (i.e., before execution of any of work units in the index space can be initiated). By the same token, the output buffer of a processing stage can be read only after all the work units in the stage have finished execution.

SUMMARY

Embodiments of the present invention that are described hereinbelow provide improved methods, devices and software for parallelization and pipelining of computer system operations.

There is therefore provided, in accordance with an embodiment of the invention, a method for computing, which includes providing software source code defining a processing pipeline including multiple, sequential stages of parallel computations, which include at least a first processing stage in which a first plurality of producer processors compute and output data to respective locations in a buffer and a second processing stage in which one or more consumer processors read the data from the buffer and apply a computational task to the data read from the buffer. A static code analysis is applied to the software source code so as to break the computational task into multiple, independent work units, and to define an index space in which the work units are identified by respective indexes. Based on the static code analysis, mapping parameters that define a mapping between the index space and addresses in the buffer are computed, indicating by the mapping the respective ranges of the data to which the work units are to be applied. The source code is compiled so that the one or more consumer processors execute the work units identified by the respective indexes while accessing the data in the buffer in accordance with the mapping.

In some embodiments, applying the static code analysis includes evaluating ranges of variables defined by the source code, and defining the index space responsively to the evaluated ranges. In a disclosed embodiment, evaluating the ranges includes applying a scalar evolution technique to evaluate the ranges.

In the disclosed embodiments, the data in the buffer define a multidimensional tensor, and the indexes in the defined index space have multiple index dimensions corresponding to the multidimensional tensor. In some embodiments, computing the mapping parameters includes defining a multidimensional transformation between the addresses in the buffer and the index space. Typically, the multi-dimensional transformation applies different, respective coefficients to transform different dimensions of the buffer.

Additionally or alternatively, computing the mapping parameters includes defining a linear transformation between values in the index space and the addresses in the buffer. In some embodiments, defining the linear transformation includes identifying a stride of a memory access operation in a program loop defined by the source code, and setting a coefficient of the linear transformation responsively to the stride. In a disclosed embodiment, defining the linear transformation includes defining a first linear transformation between the values in the index space and the addresses in an input buffer of the second processing stage responsively to a load operation, and the method includes defining a second linear transformation, different from the first linear transformation, between the values in the index space and an address space of an output buffer of the second processing stage responsively to a store operation.

In a disclosed embodiment, at least the first processing stage includes a tensor convolution operation.

In some embodiments, the method includes scheduling execution of the compiled source code responsively to the mapping, such that at least one of the work units can begin execution before all the producer processors have completed the first processing stage and outputted the data to the respective locations in the buffer, and executing the stages in the processing pipeline in accordance with the scheduling. In a disclosed embodiment, executing the stages includes signaling the one or more consumer processors to begin the execution of each of the work units upon receiving an indication from the first processing stage that a respective range of the data has been output to the buffer.

There is also provided, in accordance with an embodiment of the invention, computing apparatus, including a memory configured to store software source code defining a processing pipeline including multiple, sequential stages of parallel computations, which include at least a first processing stage in which a first plurality of producer processors compute and output data to respective locations in a buffer and a second processing stage in which one or more consumer processors read the data from the buffer and apply a computational task to the data read from the buffer. A processor is configured to apply a static code analysis to the software source code so as to break the computational task into multiple, independent work units, and to define an index space in which the work units are identified by respective indexes, and to compute, based on the static code analysis, mapping parameters that define a mapping between the index space and addresses in the buffer, indicating by the mapping the respective ranges of the data to which the work units are to be applied, and to compile the source code so that the one or more consumer processors execute the work units identified by the respective indexes while accessing the data in the buffer in accordance with the mapping.

There is additionally provided, in accordance with an embodiment of the invention, a computer software product, including a tangible, non-transitory computer-readable medium in which program instructions are stored, which instructions, when read by a computer, cause the computer to read software source code defining a processing pipeline including multiple, sequential stages of parallel computations, which include at least a first processing stage in which a first plurality of producer processors compute and output data to respective locations in a buffer and a second processing stage in which one or more consumer processors read the data from the buffer and apply a computational task to the data read from the buffer. The instructions cause the computer to apply a static code analysis to the software source code so as to break the computational task into multiple, independent work units, and to define an index space in which the work units are identified by respective indexes, and to compute, based on the static code analysis, mapping parameters that define a mapping between the index space and addresses in the buffer, indicating by the mapping the respective ranges of the data to which the work units are to be applied, and to compile the source code so that the one or more consumer processors execute the work units identified by the respective indexes while accessing the data in the buffer in accordance with the mapping.

The present invention will be more fully understood from the following detailed description of the embodiments thereof, taken together with the drawings in which:

DETAILED DESCRIPTION OF EMBODIMENTS

Overview

Parallel programming models and APIs, such as the above-mentioned CUDA, OpenCL and SYCL, are useful in parallelizing the execution of each stage in a program pipeline. Using these models, each of the work units in a given pipeline stage outputs data to a certain address or range of addresses in a buffer in memory. The buffer serves as the input for the next stage of the pipeline, and each of the work units in the next stage reads the data that it is to process from an assigned range of addresses in the buffer. The output address ranges of the work units in a given stage do not generally correspond to the input address ranges of the work units in the next stage. Consequently, as noted earlier, the next stage cannot begin execution on a given data workload until all the work units in the preceding stage have completed execution.

To increase the data throughput of the program and efficiency of execution, it would be desirable to design the program for "fine-grain pipelining," meaning that at least some of the work units in the next pipeline stage can begin execution before all the work units in the preceding pipeline stage have completed execution. This sort of pipelining could be implemented, at least in principle, by coordination between the work units in the different pipeline stages, for example by means of a suitable handshake mechanism. In practice, however, this sort of coordination is difficult and painstaking and may not be possible at all in complex, large-scale programs.

Embodiments of the present invention that are described herein enable fine-grain pipelining to be implemented automatically, by means of mapping between indexes of the work units in the index space of a given processing stage and corresponding address ranges in the input buffer of this processing stage. In other words, the index of each work unit is mapped to the range of data to be read by this work unit from the input buffer, which is the output buffer of the preceding stage. (The index space of a given stage may likewise be mapped to the address ranges in the output buffer to which the corresponding work unit write processed data.)

Once the preceding stage has output data to a given range in the buffer, the mapping of buffer addresses can be used to identify the index of the corresponding work unit or units in the next stage that will consume the data. These work units can then be triggered to execute immediately, even before all the work units in the preceding stage have completed execution. By virtue of the mapping, this sort of fine-grain pipelining can be carried out by a program scheduler without any sort of handshake or other coordination between the pipeline stages. Thus, with little or no added burden on the programmer, the pipeline can achieve higher data throughput and make more efficient use of the available computational resources (and consequently reduce overall power consumption, as well).

For simplicity of implementation, the mapping can advantageously take the form of a linear transformation between values in the index space and the addresses in the buffer. Alternatively, nonlinear mappings may be used, as long as they are reversible. In applications that involve matrix and tensor operations, the buffers are multi-dimensional, and accordingly, in some embodiments, the mapping uses a multi-dimensional transformation, which applies different coefficients to different dimensions of the buffer. In multi-stage pipelines, with different respective buffers and index spaces used in each stage, a different mapping can be used in each stage.

In some embodiments of the present invention, the tasks of index space definition and buffer address mapping are carried out automatically by a computer, which applies static code analysis to the software source code that defines the stages of the processing pipeline. The computer uses the static code analysis to break appropriate computational tasks (such as program loops) into multiple, independent work units and to define the index space accordingly, so that the work units are identified by respective indexes. Based on the static code analysis, the computer also computes mapping parameters, which define the mapping between the index space and addresses in the buffer. The computer then compiles the source code for execution by the producer and consumer processors, so that these processors execute the work units identified by the respective indexes while accessing the data in the buffer in accordance with the mapping.

System Description

Figure 1:
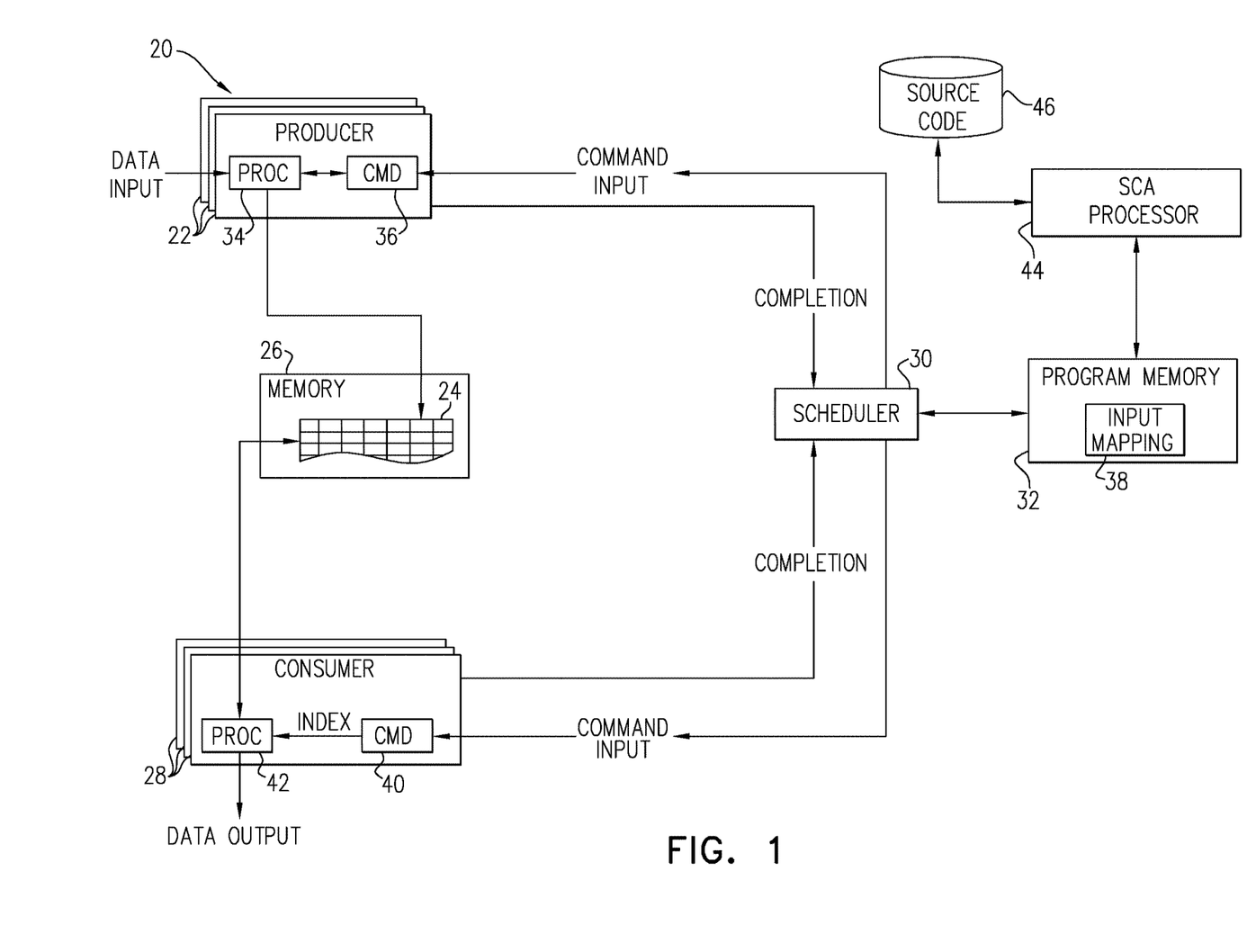
FIG. 1 is block diagram that schematically illustrates elements of a computer system with fine-grained pipelining, in accordance with an embodiment of the invention.

FIG. 1 is block diagram that schematically illustrates elements of a computer system 20 with fine-grained pipelining, in accordance with an embodiment of the invention. System 20 comprises a processing pipeline comprising multiple, sequential stages of parallel computations. For the sake of simplicity, only two stages are shown in FIG. 1: a first processing stage in which multiple producer processors 22 compute and output data to respective locations in a buffer 24 in a memory 26, such as a static random-access memory (SRAM); and a second processing stage in which one or more consumer processors 28 read the data from buffer 24 and apply a computational task to the data read from the buffer.

The terms "producer" and "consumer" are used for the sake of convenience and clarity to distinguish between the roles of the two stages shown in FIG. 1 with respect to the data in buffer 24. In practice, consumer processors 28 will output data to a further buffer and will thus serve as the producers for consumers in a subsequent processing stage, and so forth over multiple successive stages and buffers in the pipeline. The principles of the present invention may be applied in any or all of these stages, typically with a different mapping of the buffer to the index space in each stage.

In some embodiments, at least some of the processors, for example producer processors 22, comprise multiplier/accumulator processing elements 34, which are configured to carry out matrix and tensor operations, such as large-scale tensor convolutions. Arrays of processing elements of this sort are described, for example, in U.S. Pat. No. 10,489,479, whose disclosure is incorporated herein by reference. Alternatively, processors 22 and 28 may comprise special-purpose or general-purpose processing elements of other sorts.

A scheduler 30 reads program instructions from a program memory 32 and distributes corresponding command inputs to producer processors 22 and consumer processors 28. Producer processors 22 receive the command inputs in respective command buffers 36. Processing elements 34 carry out the work units invoked by the commands by reading data from appropriate addresses in an input buffer (not shown) and then writing the computational results to appropriate address ranges in buffer 24. Upon completing a work unit and outputting the corresponding data to buffer 24, processors 22 report the completion to scheduler 30. In similar fashion, consumer processors 28 receive command inputs in respective command buffers 40. These command inputs drive respective processing elements 42 to read a certain range of input data from buffer 24, apply the corresponding work unit to the input data, output the resulting output data, and report completion back to scheduler 30. As was noted earlier and will be explained further hereinbelow, each work unit is identified by a corresponding index.

Scheduler 30 is typically implemented as a software-driven process running on a programmable processor in system 20. The software that drives the operation of scheduler 30 may be downloaded to system 20 in electronic form, for example over a network. Alternatively or additionally, the software is stored in tangible, non-transitory computer-readable media, such as electronic, optical, or magnetic memory. Further alternatively or additionally, at least some of the functions of scheduler 30 may be implemented in hardware logic, which may be hard-wired or programmable.

For purposes of scheduling, each computational task that is to be carried out by a given pipeline stage is broken into multiple, independent work units, for example in accordance with one of the parallel programming models mentioned above. This division into work units may be performed in code written by a programmer. Alternatively or additionally, division of the computational tasks into work units and associated functions may be carried out automatically by a general-purpose computer processor 44 under the control of suitable software, using techniques of static code analysis (SCA).

As noted earlier, each work unit has a respective index that is assigned in an index space of the task in question. Each work unit will be applied by a processor, for example by one of consumer processors 28, to a respective range of the data in an input buffer, such as buffer 24. In deciding which work units to assign to one or more of consumer processors 28 in any given processing cycle, scheduler 30 accesses an index map 38 in memory 32. Index map 38 provides a mapping between the index space and the addresses in buffer 24, indicating the respective range of data in the buffer to which each of the work units is to be applied. Map 38 may similarly indicate the respective range of output data written to buffer 24 by each work unit executed by producer processors 22.

Thus, for example, upon receiving a notification from one or producer processors 22 that it has completed a given work unit, scheduler 30 uses mapping 38 to identify the range in buffer 24 to which the producer processor has written output data. The scheduler then uses the mapping between memory ranges and indexes of the consumer work units to schedule and initiate execution of the work units for which corresponding ranges of memory are ready in buffer 24. In general, the respective ranges of input data that are mapped to the work units executed by consumer processors 28 are different from the respective ranges of output data generated by work units of producer processors 22. As noted earlier, scheduler 30 can initiate a given consumer work unit as soon as the range of input data that is mapped to the index of the work unit is ready in buffer 24, even while producer processors 22 have not yet completed all of the producer work units.

In some embodiments, processor 44 divides computational tasks into work units, defines the index spaces, and generates mapping 38. For these purposes, processor 44 reads the software source code that defines the computational tasks from a memory 46, and then uses SCA tools to break each task into independent work units with respective indices the index space, and to compute the mapping between the index space and the input and output buffers of each pipeline stage. Processor 44 compiles the source code, using the index space and mapping, so that consumer processors 28 are able to execute the work units identified by the respective indexes while accessing the data in buffer 24 in accordance with the mapping. The software that drives the operation of processor 44 may be downloaded to the processor in electronic form, for example over a network. Alternatively or additionally, the software can be stored in tangible, non-transitory computer-readable media, such as electronic, optical, or magnetic memory.

Methods of Index Space Mapping and Execution

Figure 2:
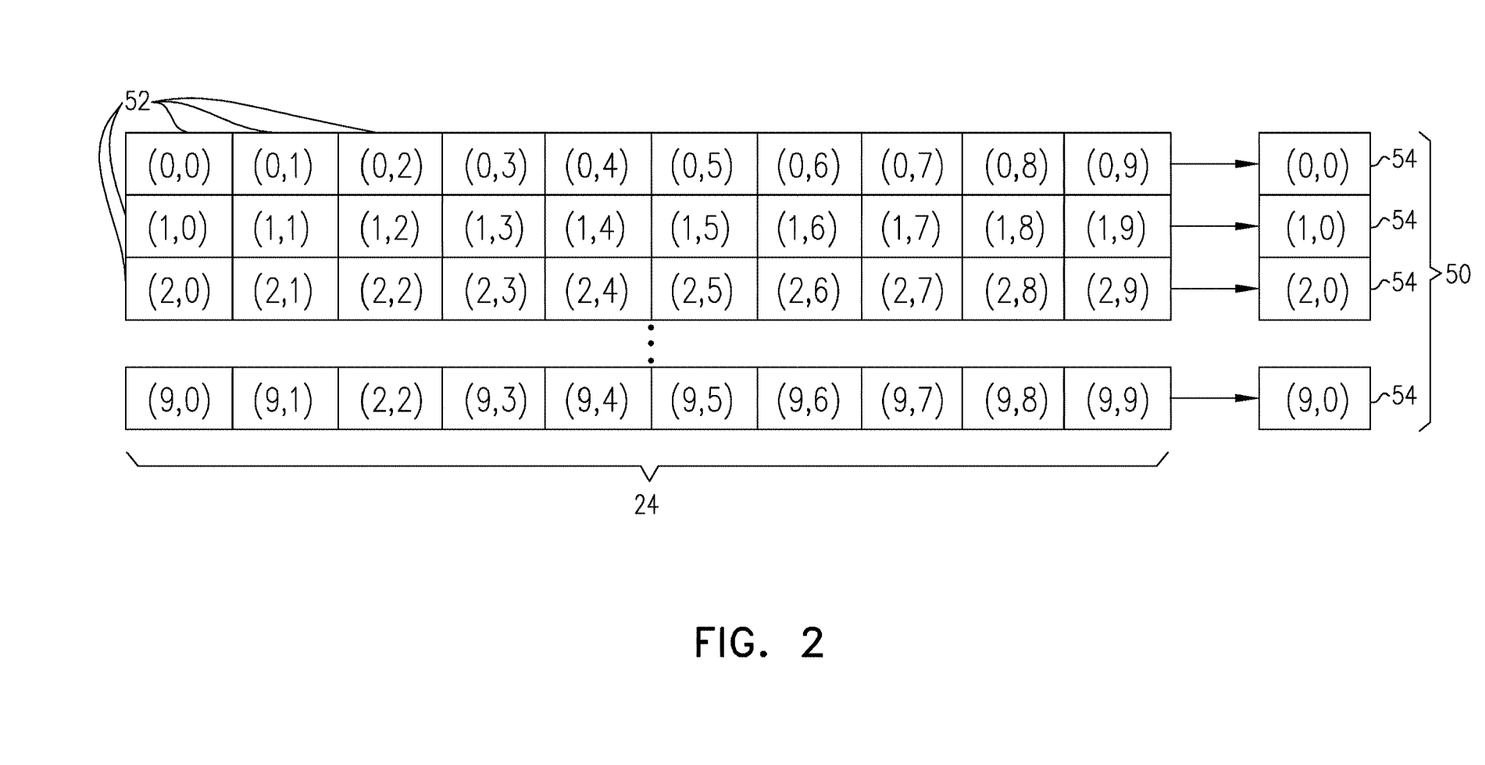
FIGS. 2 and 3 are block diagrams that schematically illustrate methods for index space mapping, in accordance with an embodiment of the invention.

FIG. 2 is a block diagram that schematically illustrates a mapping between addresses 52 in buffer 24 and an index space 50 of consumer processors 28 (FIG. 1), in accordance with an embodiment of the invention. Each address 52 contains a scalar value, corresponding, for example, to an element of a tensor output of a convolution operation by producer processors 22. In the present example, it is assumed that consumer processors 28 execute a program stage called "sum," which sums the values in each row of buffer 24 to produce a single scalar value per input row. Each index 54 in index space 50 thus identifies a work unit that sums a given row in the buffer.

The "sum" operation can be represented by the following program code:
LISTING 1—"SUM"
void main (tensor input, tensor output)
{
  int row=get_global_id(0);
  int5 coords;
  coords[1]=row;
  float sum=0;
  for (int column=0; column<input.size(0); column++)
  {
    coords[0]=column;
    sum+=input.read(coords);
  }
  coords[0]=0;
  output.store (coords,sum)
}

The appropriate size of index space 50 in this simplified example is (10,1), since there are ten rows in buffer 24, and each work unit consumes a whole row. A work unit of index value $(x_i, x_j)$ will consume the data in a range of addresses 52 between $f_{min}(x)$ and $f_{max}(x)$ that is given by the following linear transformation in each of the i and j (column and row) dimensions:

$$f_{min}(x) = \alpha_{min} x + \beta_{min}$$

$$f_{max}(x) = \alpha_{max} x + \beta_{max},$$

Applying the mapping in the two dimensions of the input tensor in buffer 24 gives the following mapping parameters:

Dim0 (columns): $\alpha_{min}=0$, $\alpha_{max}=0$, $\beta_{min}=0$, $\beta_{max}=9$ Dim1 (rows): $\alpha_{min}=1$, $\alpha_{max}=1$, $\beta_{min}=0$, $\beta_{max}=0$ This sort of mapping can be specified explicitly by a programmer of the processing pipeline; or it may alternatively be inferred by applying a static code analysis to the program, for example by a suitable compiler.

According to this mapping, the work unit identified by index space value (5,0) will be mapped to the following range of addresses in buffer 24:

Dim0 start is 0*5+0=0

Dim0 end is 0*5+9=9

Dim1 start is 1*5+0=5

Dim1 end is 1*5+0=5

Figure 5:
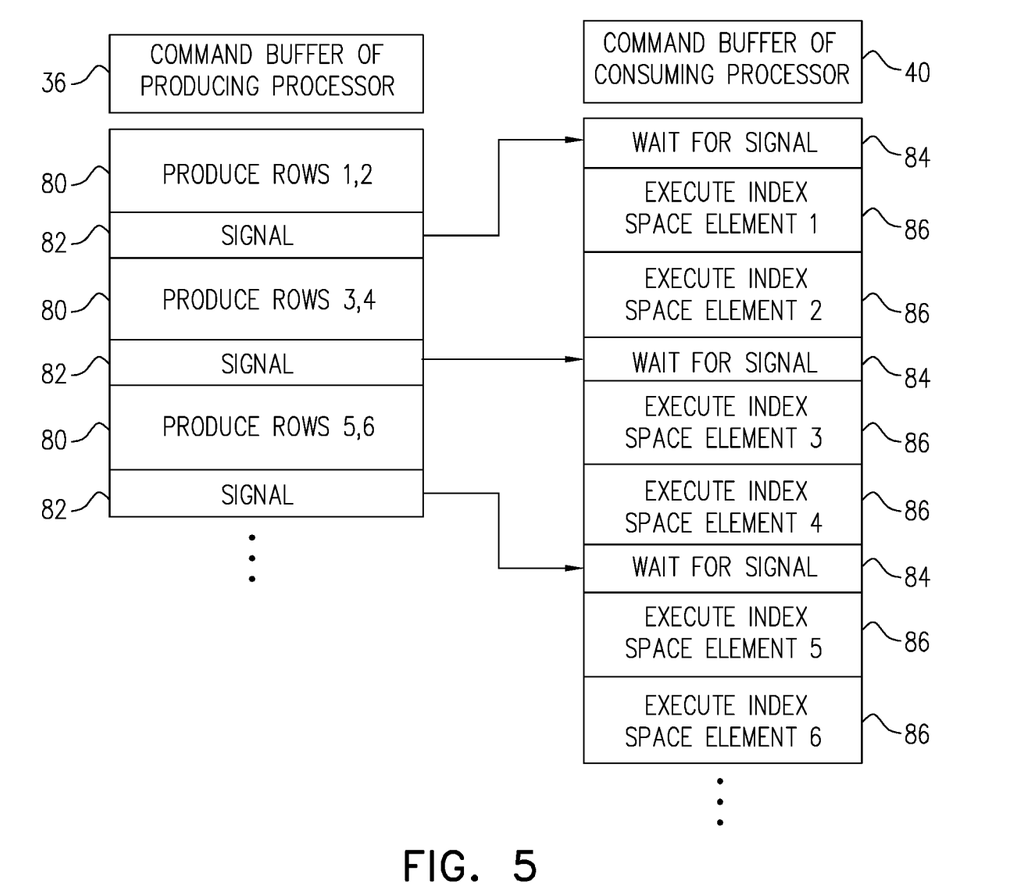
FIG. 5 is a block diagram that schematically illustrates execution of a sequence of pipelined operations, in accordance with an embodiment of the invention.

Thus, this work unit will access the row of input tensor elements (5,0) . . . (5,9), as required by the above code listing. As soon as the work unit (or units) of producer processors 22 that is responsible for writing this row of tensor elements has been completed, scheduler 30 can invoke the execution of work unit (5,0) by a consumer processor 28. This mode of operation is illustrated in FIG. 5.

Figure 3:
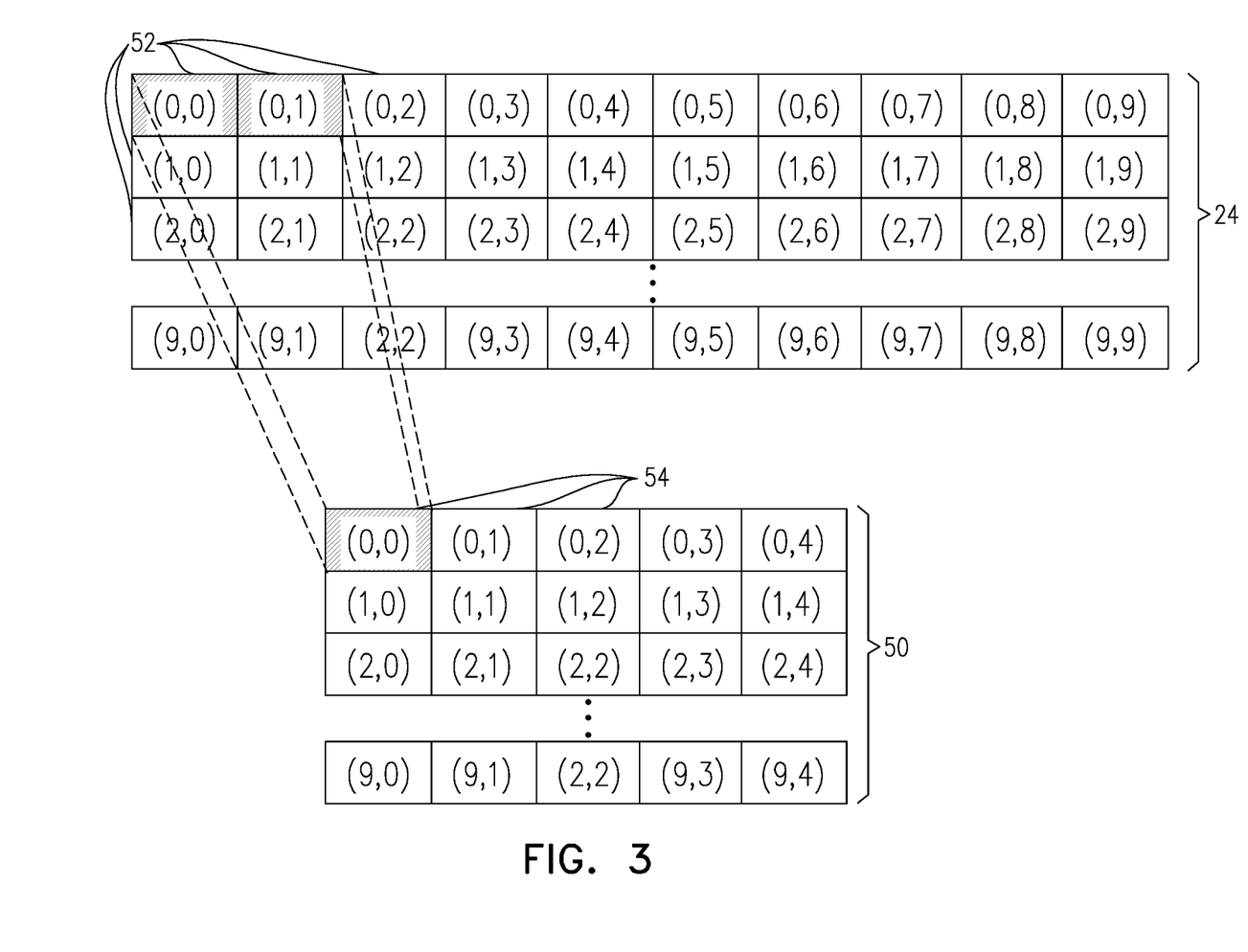

FIG. 3 is a block diagram that schematically illustrates a mapping between addresses 52 in buffer 24 and index space 50 of consumer processors 28, in accordance with another embodiment of the invention. In this example, each work unit executed by consumer processors 28 consumes two adjacent data elements in buffer 24. Index space 50 thus has dimensions (10,5). In this case, the mapping parameters will be:

Dim0 (columns): $\alpha_{min}=2$, $\alpha_{max}=2$, $\beta_{min}=0$, $\beta_{max}=1$ Dim1 (rows): $\alpha_{min}=1$, $\alpha_{max}=1$, $\beta_{min}=0$, $\beta_{max}=0$ For the sake of simplicity, in the examples shown in FIGS. 2 and 3, each index 54 is mapped to a one-dimensional array of addresses 52 extending along a single row in buffer 24. In general, however, for purposes of multi-dimensional tensor operations, the index space will have multiple index dimensions, corresponding to the dimensions of the tensor. Each index 54 will be mapped to an array of two, three, or more dimensions in the buffer, with different mapping parameters in each dimension, i.e., different, respective coefficients $\alpha_{min}$, $\alpha_{max}$, $\beta_{min}$, and $\beta_{max}$ for each dimension of the buffer. The mapping parameters may be set by a programmer, or they may be determined automatically using SCA, as described further hereinbelow.

Figure 4:
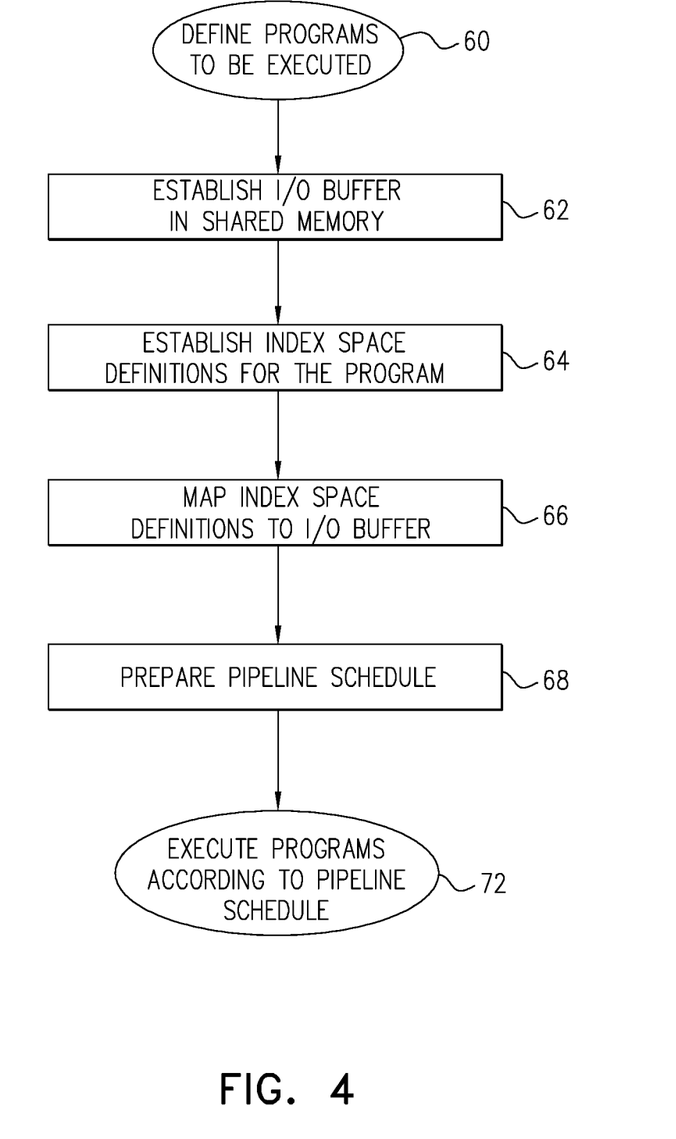
FIG. 4 is a flow chart that schematically illustrates a method for pipelined program execution, in accordance with an embodiment of the invention.

FIG. 4 is a flow chart that schematically illustrates a method for pipelined program execution, which makes use of the sort of mapping that is described above, in accordance with an embodiment of the invention. For the sake of clarity and concreteness, the method is described with reference to the elements of system 20 that are shown in FIG. 1. Alternatively, this method may be carried out, mutatis mutandis, in other processing environments that support pipelined execution of parallel processing operations.

In a program definition step 60, a programmer defines a processing pipeline comprising multiple, sequential stages of parallel computations. These stages include at least a first processing stage in which producer processors 22 compute and output data to respective locations in buffer 24, and a second processing stage in which one or more consumer processors 28 read the data from buffer 24 and apply a computational task to the data. At a buffer establishment step 62, buffer 24 is created in memory 26, which is shared by the producing and consuming processing stages, so that buffer 24 serves as the output buffer for the first stage and the input buffer for the second stage. As noted earlier, multiple processing stages can be defined in this way, with the consumer processors in one stage becoming the producers for the next.

The computational task to be performed at each processing stage is broken into multiple, independent work units, at a work unit definition step 62. Each such work unit will be applied by a given processor, as a consumer, to a respective range of the data in the appropriate buffer. The processor will write the computational result of the work unit, as a producer, to the next buffer in the pipeline. An index space is defined for each stage of the pipeline, and respective indexes are assigned to the work units in each stage, at an index space establishment step 64. A mapping is then generated between the index space of each stage and the respective ranges of addresses in the buffer that are to be accessed by the indexed work units, at a mapping step 66.

The principles and techniques that are to be applied in steps 62-66 were described above, together with a number of examples. For consumer processors 28 (FIG. 1), the mapping of step 66 indicates the respective range of the data in buffer 24 to which each of the work units is to be applied. For producer processors 22, there may also be a mapping indicating the range of data that is written to buffer 24 by each producer work unit. As noted earlier, steps 62, 64 and 66 may each be performed explicitly by a programmer, using tools such as those provided by CUDA, OpenCL or SYCL, for example. Alternatively, some or all of these steps may be performed automatically, for example by a suitably configured compiler using static code analysis. Further details of this sort of automatic implementation are described in the above-mentioned provisional patent application.

On the basis of the mapping created at step 66, a pipeline schedule is generated for execution of the program, at a scheduling step 68. This schedule indicates to scheduler 30 the dependence between completion of producer work units and the initiation of consumer work units. In other words, when a producer completion indicates to scheduler 30 that a certain range of data is now ready in buffer 24, the mapping of this range to the consumer index space can be used to initiate the work units that will consume this range of data. Using this schedule, at least one of the consumer work units (and typically multiple consumer work units) can begin execution before all the producer work units have been completed and outputted their data to their respective locations in buffer 24. The program is then executed in the pipeline of system 20 in accordance with the schedule, at an execution step 72.

FIG. 5 is a block diagram that schematically illustrates execution of a sequence of pipelined operations 80 and 86, in accordance with an embodiment of the invention. This example assumes that operations 80 are carried out by producer processors 22, while operations 86 are carried out by consumer processors 28 (FIG. 1), in accordance with the specific mapping that is shown in FIG. 2. Each work unit of operations 80 produces two rows of output data in buffer 24, which are mapped, in turn, to two work units of operations 86, having successive, respective indexes 54 in index space 50.

Thus, after outputting data to the first two rows in buffer 24, producer processor 22 issues a signal 82 (to scheduler 30), indicating that the corresponding producer work unit has been completed. Consumer processors 28 wait for a corresponding command from scheduler 30, in a wait state 84. Upon receiving the command, the consumer processor executes the first two work units of operations 86. In parallel, one of producer processors 22 produces and outputs data to the next two rows in buffer 24, and then issues signal 82 to trigger the next two work units of the consumer operation. These steps continue sequentially until the entire workload has been processed.

Index Space Mapping Using Static Code Analysis

Figure 6:
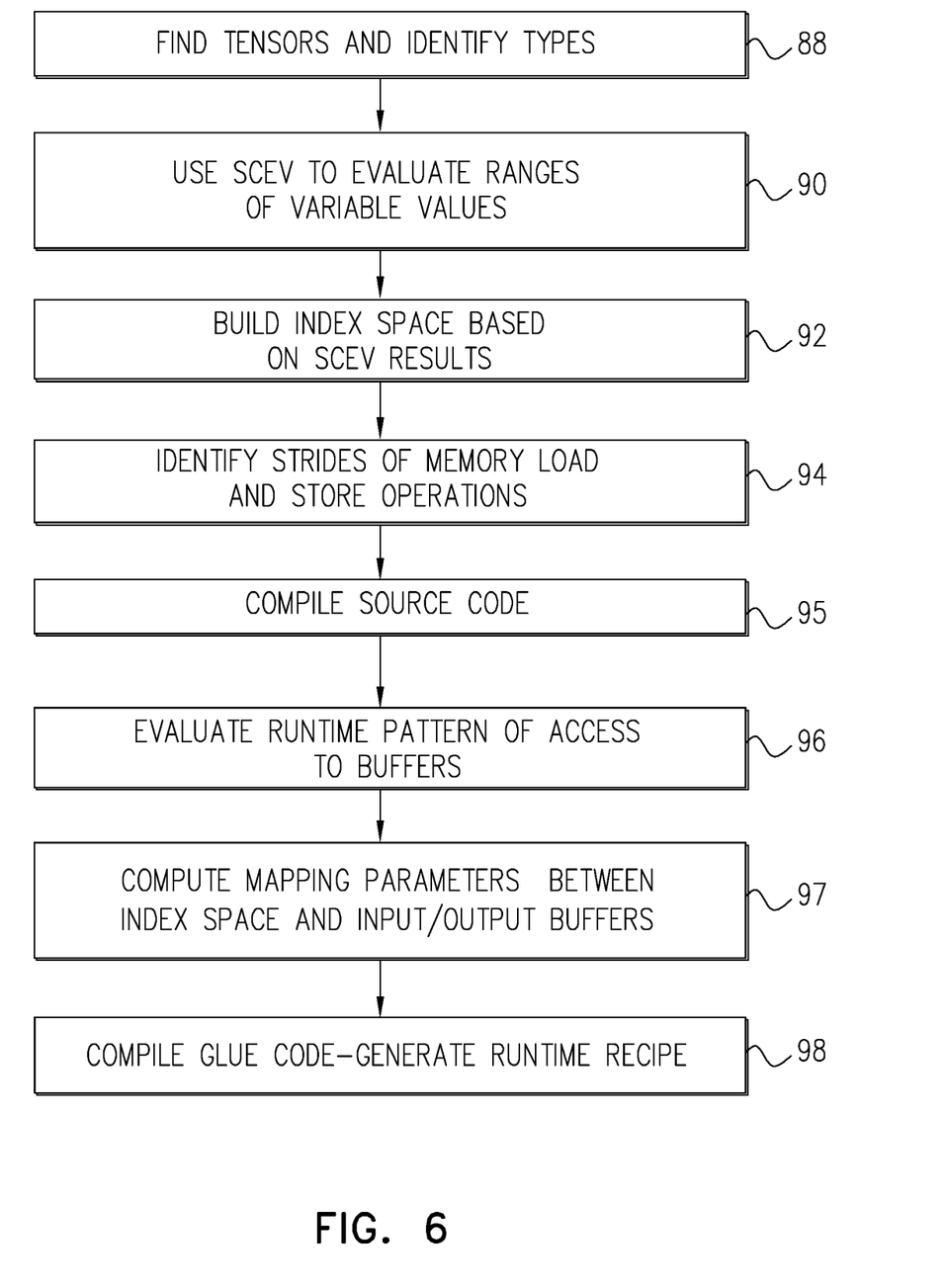
FIG. 6 is a flow chart that schematically illustrates a method for index space mapping using static code analysis (SCA), in accordance with an embodiment of the invention.
Figure 7:
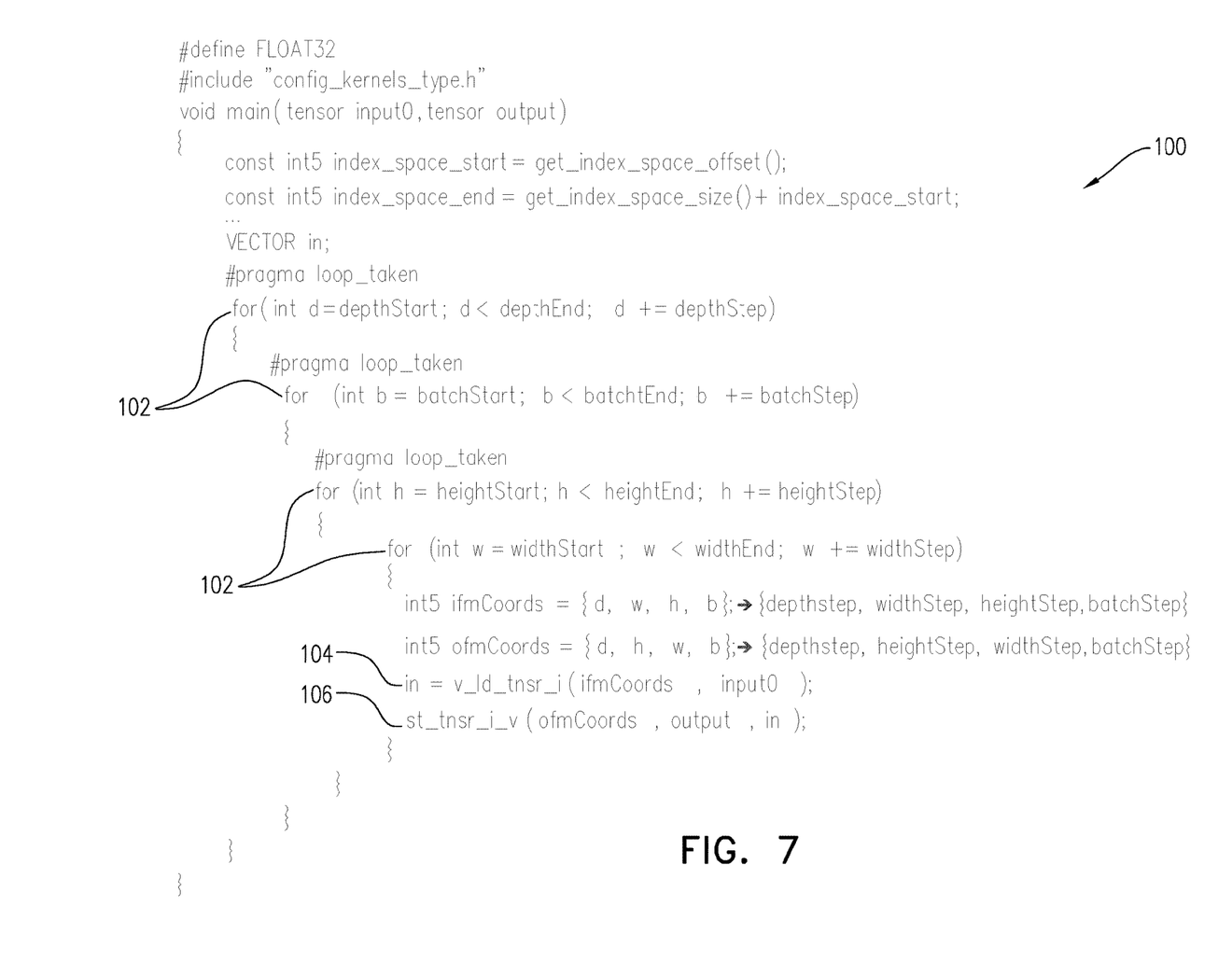
FIG. 7 is a software code fragment illustrating elements of the method of FIG. 6.

Reference is now made to FIGS. 6 and 7, which schematically illustrate a method for index space mapping using static code analysis (SCA), in accordance with an embodiment of the invention. FIG. 6 is a flow chart showing key steps in the method, while FIG. 7 is a software code fragment 100 showing how the method can be applied. The steps in FIG. 6 correspond achieve the same results as steps 64 and 66 in FIG. 4, while automating the processes of building the index space and mapping the index space to the input and output buffers of a given processing stage. The method is described below, for the sake of convenience and clarity, with reference to the elements of system 20 (FIG. 1), but it may alternatively be applied in other multi-stage parallel processing environments.

To establish the index space definitions, processor 44 first analyzes source code 46 to identify tensors and their types, at a tensor identification step 88. Tensor types in this context include input tensors, identified by load commands in code 46, and output tensors, identified by store commands. (Tensors that are not inputs or outputs to or from a given operation are identified as auxiliary tensors.)

Processor 44 evaluates the ranges of values of the tensor variables, in a value evaluation step 90. For this purpose, processor 44 applies a technique of scalar evolution (SCEV), as is known in the art, to evaluate the variable ranges. Software that can be used for this purpose is available for download, for example, from the LLVM Project at LLVM.org/doxygen. One of the functions of SCEV (though not the only function) is to analyze program loops that are to be parallelized in order to evaluate the ranges of variable values in these loops.

Turning to the code listing in FIG. 7, for example, processor 44 identifies the relevant memory access operations (load and store) from and to the corresponding input and output buffers in an input instruction 104 and an output instruction 106. Loops in several different dimensions are defined by "for" statements 102. In this simple example, the variables are d, b, w, and h, and their ranges are identified by the corresponding "for" statements. In more complex programs, however, the variable ranges can be more difficult to extract.

Based on the variables and their ranges as derived by SCEV, processor 44 breaks each computational task into multiple, independent work units, and defines an index space in which the work units for each processing stage are identified by respective indexes, at an index space building step 92. In the present example, the index space will have dimensions {d, w, h, b}, with ranges determined by the ranges of these variables in the respective "for" statements 102, i.e., depthEnd, batchEnd, etc. In more complex cases, processor 44 finds the ranges on the basis of the SCEV analysis performed at step 90.

Processor 44 uses the results of the static code analysis described above in computing mapping parameters that define the mapping between the index space built at step 92 and addresses in the buffer. As explained earlier, this mapping indicates the respective ranges of the data to which the work units are to be applied. The mapping parameters depend on the strides of memory load and store, which processor 44 identifies in the program in a stride identification step 94. In the case of code fragment 100, the strides of the index space parameters d, w, h, b are defined by the respective "for" statements 102 as depthStep, widthStep, heightStep, and batchStep. Processor compiles the source code, at a source compilation step 95, in order to generate object code that can be run by processor 22, 28 (FIG. 1).

When the program code runs, the patterns of access to the variables and their ranges depend not only on the operations in each processing stage, but also on the runtime connections between each stage and the next. Processor 44 therefore evaluates the runtime patterns of access to the input and output buffers during runtime of the object code generated in step 95, at a runtime evaluation step 96. For this purpose, processor 44 parses the SCEV results to generate a listing of the variables and relevant parameters, such as the buffer offsets and strides. (The listing may conveniently be generated as an Executable and Linkable Format (ELF) file, for example.) Based on this information, processor 44 generates "glue code," which ties the output of each stage to the input of the next stage. As part of the glue code generation, the processor evaluates the actual runtime patterns of buffer access by the processing units in the successive pipeline stages.

Based on the properties of the index space and memory access operations provided by steps 94 and 96, processor 44 computes mapping parameters between the index space and the buffers, at a parameter computation step 97. The start and end values and the stride found in each dimension at steps 94 and 96 determine the mapping coefficients for that dimension. Input instruction 104 defines the coefficients of a linear transformation between the index space values and the addresses in the input buffer of this processing stage; while output instruction 106 defines the coefficients of another linear transformation between the index space values and the addresses in the output buffer of this processing stage. The transformations between the index space in any given stage in the processing pipeline and the input and output buffers for the given stage are typically different from one another.

Once processor 44 has completed its SCA and runtime analysis of source code 46 and generated the appropriate index space mappings for all the processing stages in the pipeline, the processor compiles the glue code to generate a runtime "recipe," at a runtime compilation step 98. The resulting executable code includes both kernel code for each processing stage and the glue code that ties the output of each stage to the input of the next stage, as explained above. Following this compilation, the output transformation from each processing stage, such as producer processors 22 in FIG. 1, to its output buffer, such as buffer 24, will map to the same range of physical addresses in memory 26 as the input transformation of the next processing stage, such as consumer processors 28. On the basis of this mapping, scheduler 30 is able to schedule the execution of the compiled code so that the consumer work units can begin execution before all the producer work units have been completed and outputted their data to the respective locations in the buffer.

The listing below presents an algorithmic implementation of the method of FIG. 6, using the get_scev function provided by the LLVM library mentioned above at step 90. The algorithm assumes that memory types, dependency paths (between producers and consumers), and arithmetic relations between the variable values are known to the compiler.

LISTING 2

1. struct {
2. value alpha low;
3. value alpha high;
4. value beta_low;
5. value beta_high;
6. }low_high;
7. low_high_data_input[number_of_dimension]
8. low_high_data_output[number_of_dimension]
9. For % parameter in(function input)
9.1 If in memory type:
9.1.1 memory_stack.push(parameter)
9.2 end
10. End
11. while !empty(memory_stack):
11.1% temp=memory_stack.pop( )
11.2% consumer_vec=find_consumer(% temp)
11.3 for(auto element: consumer_vec)
11.3.1 if(is_load(% element))
11.3.1.1% scev_value=get_scev(% element)
11.3.1.2 parse_scev(% scev_value,% data_input)
11.3.2 end
11.3.3 if (is_store(%element))
11.3.3.1% scev_value=get_scev(% data_output,% element)
11.3.3.2 parse scev(% scev_value, % data_output)
11.3.4 end
11.4 end
12. End
13. Create_indexSpaceAndMapping( )

In the above algorithm, the function "find_consumer" finds all consumers of memory, while "is_load" and "is_store" determines whether a given element is a load or store operation. At the conclusion of the analysis, "parse_scev" sets the mapping coefficients α and β for each dimension of the index space. Create_indexSpaceAndMapping reads the data input and data output values and builds the corresponding sections in memory.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for computing, comprising:
providing software source code defining a processing pipeline including multiple, sequential stages of parallel computations, which include at least a first processing stage in which a first plurality of producer processors compute and output data to respective locations in a buffer and a second processing stage in which one or more consumer processors read the data from the buffer and apply a computational task to the data read from the buffer;
applying a static code analysis to the software source code so as to break the computational task into multiple, independent work units, and to define an index space in which the work units are identified by respective indexes;

based on the static code analysis, computing mapping parameters that define a mapping between the index space and addresses in the buffer, indicating by the mapping the respective ranges of the data to which the work units are to be applied;

compiling the source code so that the one or more consumer processors execute the work units identified by the respective indexes while accessing the data in the buffer in accordance with the mapping;

scheduling execution of the compiled source code responsively to the mapping; and executing the stages in the processing pipeline in accordance with the scheduling, wherein executing the stages comprises signaling the one or more consumer processors to begin the execution of each of the work units upon receiving an indication from the first processing stage that a respective range of the data has been output to the buffer, such that at least one of the work units begins execution by at least one of the consumer processors before all the producer processors have completed the first processing stage and outputted the data to the respective locations in the buffer.

2. The method according to claim 1, wherein applying the static code analysis comprises evaluating ranges of variables defined by the source code, and defining the index space responsively to the evaluated ranges.

3. The method according to claim 2, wherein evaluating the ranges comprises applying a scalar evolution technique to evaluate the ranges.

4. The method according to claim 1, wherein the data in the buffer define a multidimensional tensor, and wherein the indexes in the defined index space have multiple index dimensions corresponding to the multidimensional tensor.

5. The method according to claim 4, wherein computing the mapping parameters comprises defining a multidimensional transformation between the addresses in the buffer and the index space.

6. The method according to claim 5, wherein the multidimensional transformation applies different, respective coefficients to transform different dimensions of the buffer.

7. The method according to claim 1, wherein computing the mapping parameters comprises defining a linear transformation between values in the index space and the addresses in the buffer.

8. The method according to claim 7, wherein defining the linear transformation comprises identifying a stride of a memory access operation in a program loop defined by the source code, and setting a coefficient of the linear transformation responsively to the stride.

9. The method according to claim 8, wherein defining the linear transformation comprises defining a first linear transformation between the values in the index space and the addresses in an input buffer of the second processing stage responsively to a load operation, and wherein the method comprises defining a second linear transformation, different from the first linear transformation, between the values in the index space and an address space of an output buffer of the second processing stage responsively to a store operation.

10. The method according to claim 1, wherein at least the first processing stage comprises a tensor convolution operation.

11. Computing apparatus, comprising:

a memory configured to store software source code defining a processing pipeline including multiple, sequential stages of parallel computations, which include at least a first processing stage in which a first plurality of producer processors compute and output data to respective locations in a buffer and a second processing stage in which one or more consumer processors read the data from the buffer and apply a computational task to the data read from the buffer;

a processor, which is configured to apply a static code analysis to the software source code so as to break the computational task into multiple, independent work units, and to define an index space in which the work units are identified by respective indexes, and to compute, based on the static code analysis, mapping parameters that define a mapping between the index space and addresses in the buffer, indicating by the mapping the respective ranges of the data to which the work units are to be applied, and to compile the source code so that the one or more consumer processors execute the work units identified by the respective indexes while accessing the data in the buffer in accordance with the mapping;

a scheduler, which is configured to schedule execution of the compiled source code by the producer and consumer processors responsively to the mapping, and to signal the one or more consumer processors to begin the execution of each of the work units upon receiving an indication from the first processing stage that a respective range of the data has been output to the buffer, such that at least one of the work units begins execution by at least one of the consumer processors before all the producer processors have completed the first processing stage and outputted the data to the respective locations in the buffer; and the one or more consumer processors configured to execute each of the work units based on the received signal.

12. The apparatus according to claim 11, wherein at least the first processing stage comprises a tensor convolution operation.

13. A computer software product, comprising a tangible, non-transitory computer-readable medium in which program instructions are stored, which instructions, when read by a computer, cause the computer to perform the steps of:

providing software source code defining a processing pipeline including multiple, sequential stages of parallel computations, which include at least a first processing stage in which a first plurality of producer processors compute and output data to respective locations in a buffer and a second processing stage in which one or more consumer processors read the data from the buffer and apply a computational task to the data read from the buffer;

applying a static code analysis to the software source code so as to break the computational task into multiple, independent work units, and to define an index space in which the work units are identified by respective index;

computing, based on the static code analysis, mapping parameters that define a mapping between the index space and addresses in the buffer, indicating by the mapping the respective ranges of the data to which the work units are to be applied;

compiling the source code so that the one or more consumer processors execute the work units identified by the respective indexes while accessing the data in the buffer in accordance with the mapping;

scheduling execution of the compiled source code responsively to the mapping; and executing the stages in the processing pipeline in accordance with the scheduling, wherein executing the stages comprises signaling the one or more consumer processors to begin the execution of each of the work units upon receiving an indication from the first processing stage that a respective range of the data has been output to the buffer, such that at least one of the work units begins execution by at least one of the consumer processors before all the producer processors have completed the first processing stage and outputted the data to the respective locations in the buffer.

14. The product according to claim 13, wherein the instructions cause the computer to apply the static code analysis so as to evaluate ranges of variables defined by the source code, and to define the index space responsively to the evaluated ranges.

15. The product according to claim 14, wherein evaluating the ranges comprises applying a scalar evolution technique to evaluate the ranges.

16. The product according to claim 13, wherein the data in the buffer define a multidimensional tensor, and wherein the indexes in the defined index space have multiple index dimensions corresponding to the multidimensional tensor.

17. The product according to claim 16, wherein the instructions cause the computer to define a multidimensional transformation between the addresses in the buffer and the index space.

18. The product according to claim 17, wherein the multi-dimensional transformation applies different, respective coefficients to transform different dimensions of the buffer.

19. The product according to claim 13, wherein the instructions cause the computer to define a linear transformation between values in the index space and the addresses in the buffer.

20. The product according to claim 19, wherein defining the linear transformation comprises identifying a stride of a memory access operation in a program loop defined by the source code, and setting a coefficient of the linear transformation responsively to the stride.

21. The product according to claim 20, wherein defining the linear transformation comprises defining a first linear transformation between the values in the index space and the addresses in an input buffer of the second processing stage responsively to a load operation, and wherein the instructions cause the computer to define a second linear transformation, different from the first linear transformation, between the values in the index space and an address space of an output buffer of the second processing stage responsively to a store operation.

22. The product according to claim 13, wherein at least the first processing stage comprises a tensor convolution operation.

* * * * *